United States Patent
Macneille et al.

(10) Patent No.: US 7,865,298 B2
(45) Date of Patent: Jan. 4, 2011

(54) SYSTEM AND METHOD FOR PROVIDING ROUTE INFORMATION TO A DRIVER OF A VEHICLE

(75) Inventors: Perry Robinson Macneille, Lathrup Village, MI (US); Michael Edward Loftus, Northville, MI (US)

(73) Assignee: Ford Motor Company, Dearborn, MI (US)

( * ) Notice: Subject to any disclaimer, the term of this patent is extended or adjusted under 35 U.S.C. 154(b) by 915 days.

(21) Appl. No.: 11/743,931

(22) Filed: May 3, 2007

(65) Prior Publication Data

US 2008/0275644 A1    Nov. 6, 2008

(51) Int. Cl.
*G01C 21/26* (2006.01)
*G01C 21/34* (2006.01)

(52) U.S. Cl. .................. 701/201; 701/209; 701/123; 340/995.19

(58) Field of Classification Search ............ None
See application file for complete search history.

(56) References Cited

U.S. PATENT DOCUMENTS

| | | | |
|---|---|---|---|
| 5,778,326 A | 7/1998 | Moroto et al. | |
| 5,832,396 A | 11/1998 | Moroto et al. | |
| 5,892,346 A | 4/1999 | Moroto et al. | |
| 5,913,917 A * | 6/1999 | Murphy | 701/123 |
| 6,034,626 A * | 3/2000 | Maekawa et al. | 340/995.21 |
| 6,216,086 B1 * | 4/2001 | Seymour et al. | 701/202 |
| 6,256,579 B1 * | 7/2001 | Tanimoto | 701/201 |
| 6,269,303 B1 * | 7/2001 | Watanabe et al. | 701/209 |
| 6,484,092 B2 * | 11/2002 | Seibel | 701/209 |
| 6,487,477 B1 | 11/2002 | Woestman et al. | |
| 6,687,581 B2 | 2/2004 | Deguchi et al. | |
| 6,701,248 B2 * | 3/2004 | Petzold et al. | 701/202 |
| 7,013,205 B1 | 3/2006 | Hafner et al. | |
| 2002/0120396 A1 * | 8/2002 | Boies et al. | 701/209 |
| 2002/0188387 A1 | 12/2002 | Woestman et al. | |
| 2004/0074682 A1 | 4/2004 | Fussey et al. | |
| 2005/0228553 A1 | 10/2005 | Tryon | |
| 2007/0294026 A1 * | 12/2007 | Schirmer | 701/202 |
| 2008/0004794 A1 * | 1/2008 | Horvitz | 701/200 |
| 2008/0125958 A1 * | 5/2008 | Boss et al. | 701/123 |
| 2008/0221787 A1 * | 9/2008 | Vavrus | 701/201 |

FOREIGN PATENT DOCUMENTS

| | | |
|---|---|---|
| EP | 1842758 A1 | 10/2007 |
| WO | 2006135868 A3 | 12/2006 |
| WO | 2007061409 A3 | 5/2007 |
| WO | 2007103840 A2 | 9/2007 |

* cited by examiner

*Primary Examiner*—Michael J. Zanelli
(74) *Attorney, Agent, or Firm*—Jennifer M. Stec; Brooks Kushman P.C.

(57) ABSTRACT

A system and method for providing route information to a driver of a vehicle given a predetermined destination having more than one route available to reach the predetermined destination includes receiving a driver input indicating a vehicle operating preference. Operating characteristics for the vehicle, such as a predicted time to reach the predetermined destination, are determined for at least some of the routes. One of the routes is selected based at least in part on the determined operating characteristics and the vehicle operating preference. An informational output is provided to the driver indicating the selected route.

20 Claims, 4 Drawing Sheets

SYSTEM AND METHOD FOR PROVIDING ROUTE INFORMATION TO A DRIVER OF A VEHICLE

BACKGROUND OF THE INVENTION

1. Field of the Invention

The present invention relates to a system and method for providing route information to a driver of a vehicle.

2. Background Art

With the ever increasing need to produce vehicles that are more fuel efficient, hybrid electric vehicles (HEV's) have provided an improvement in fuel economy over many conventional vehicles that utilize only an internal combustion engine to drive the vehicle. One of the primary advantages of an HEV is that it allows the vehicle to be powered by one or more electric motors under certain operating conditions. For example, if the speed of the vehicle is relatively moderate, and the battery or other electrical power sources sufficiently charged, the engine may be shut off, and the vehicle powered exclusively by the electric motors. As operating conditions change, the engine may be started to provide additional power, and if needed, operate a generator to charge the battery.

In order to ensure that the battery has enough power to perform desired functions—e.g., operate a generator to start the engine, or provide power to a motor to provide torque to the vehicle wheels—a state of charge of the battery is maintained within a predetermined range. For example, if the state of charge drops below a certain value, the engine may be started to drive a generator to charge the battery. Operation of the engine consumes fossil fuel, and produces undesirable emissions.

Conversely, if the state of charge rises above a certain level, additional charging may be undesirable. In such a case, additional charging of the battery is rejected. Therefore, if the vehicle is slowed or stopped—a situation that may typically call for the capture of regenerative braking energy—the vehicle's friction brakes may be used so that the battery is not overcharged. This is inefficient, as the energy available from the braking operation is lost.

The temperature of a battery can also affect its ability to accept charge and deliver power. For example, if a battery is relatively cold, it may be able to accept charge and deliver power, but it may do so very slowly—this can be inefficient. In the case of a battery being too warm, charging or discharging may damage the battery, and so various control mechanisms may be in place to ensure that the battery does not receive charge or deliver power when it is above a certain temperature. This too is inefficient, particularly in the case of HEV's, where the engine may need to be run merely because the battery is too warm.

The temperature and SOC of a battery can be affected by many factors, including driving habits and external conditions. For example, weather conditions—e.g., ambient temperature—can affect the state of the HEV's powertrain, and specifically the battery, throughout a drive. Another factor influencing driving efficiency is traffic conditions. Such conditions can include, for example, the speed of traffic flow, traffic control factors such as stop signs and street lights, and the presence of obstacles such as construction zones. Moreover, the position of a vehicle vis-à-vis other vehicles—i.e., is the vehicle following other vehicles or driving freely—can influence the control strategy used to optimize performance and fuel economy.

Often there are multiple routes from a traveling vehicle's current location to its destination, and the choice of route affects the conditions that are encountered, and the order in which they are encountered. The conditions influence the driver's behavior, and consequently, vehicle operating efficiency and travel time. Moreover, each driver may have different preferences between reducing travel time and increasing operating efficiency. Indeed, the same driver may have one set of preferences for one trip, and another set of preferences for another trip.

Therefore, a need exists for a system and method for providing route information to a driver of a vehicle that is at least partly based on various external conditions, and also takes into account the driver's preferences for such things as time to reach destination and fuel efficiency.

SUMMARY OF THE INVENTION

Accordingly, the present invention provides a system and method for providing route information to a driver of a vehicle, where the route information is at least partly based on external conditions and driver preferences. Embodiments of the system and method examine a number of vehicle operating characteristics for a number of different routes to reach a predetermined destination. Such operating characteristics may include, for example, one or more of a predicted travel time to reach the predetermined destination, a predicted fuel economy for the vehicle, and a final state of charge for the battery—i.e., the SOC of the battery when the vehicle reaches the predetermined destination.

In addition to the vehicle operating characteristics, embodiments of the present invention also consider a number of vehicle operating preferences, which may be, for example, input by a vehicle driver. These vehicle operating preferences may include, for example, a relative time to reach the predetermined destination, and a relative fuel economy for the vehicle. Specifically, a driver may input into a vehicle control system information indicating that fuel economy is more important than reducing travel time, or conversely, that reducing travel time is the more important factor. Other preferences can be input as well, including a relative final SOC for the battery.

The value of the final SOC can influence not only how much the engine will need to be used, but also the overall life expectancy of the battery. For example, if a driver chooses to have a final SOC within a recommended range, the battery life may be extended. In contrast, if a driver chooses to allow the SOC for the battery to drop to a low level as the final destination is reached, the extra discharge may reduce the battery's life expectancy. On the other hand, allowing the SOC to drop to a low value may reduce engine use in an HEV and increase fuel efficiency.

As noted above, external conditions can affect the vehicle operating characteristics for a given route, and these conditions may change for different routes. Thus, each route considered will likely yield different vehicle operating characteristics. The external conditions can be input through, for example, sensors, such as temperature sensors or other weather sensors for monitoring environmental conditions. A navigation system may be used to provide distance information and information related to the topography and geography of the routes. In other embodiments, a global positioning system (GPS) may be used to determine the conditions of the terrain in real time. Certain traveler information systems currently known and used can provide information related to current traffic conditions, construction, and other travel information.

Based at least in part on the vehicle operating preferences and the determined operating characteristics for the vehicle, embodiments of the present invention can choose a route to reach the predetermined destination. This choice can then be communicated to the driver, for example through a navigation system. In some embodiments, one or more of the following may be used to indicate to the driver the chosen route: vibration, audible alerts—including speech—and visual signals.

Although the discussion thus far has addressed certain routes to reach a predetermined destination, it is understood that each route may be divided into any number of sub-routes, each of which has a similar analysis performed. Thus, at each point where a driver may choose between different routes, the present invention may be invoked to determine the best choice for the driver. This choice can then be communicated to the driver at a level of detail such as indicating when to change lanes, and which highway exits to take.

Embodiments of the present invention also provide a method for providing route information to a driver of a vehicle given a predetermined destination having more than one route available to reach the predetermined destination. The vehicle includes an engine and an energy storage device operable to output electrical energy to vehicle electrical loads. The method includes receiving an input indicating a vehicle operating preference including at least one of a relative travel time to reach the predetermined destination or a relative fuel economy for the vehicle. Operating characteristics for the vehicle are determined for at least some of the routes available to reach the predetermined destination. The operating characteristics include at least one of a predicted travel time to reach the predetermined destination and a predicted fuel economy for the vehicle. The method also includes selecting one of the routes based at least in part on the determined operating characteristics and the received vehicle operating preference, and providing an informational output indicating the selected route.

Embodiments of the present invention also provide a method that includes receiving an input indicating driver operating preferences for the vehicle, the driver operating preferences including at least one of a relative travel time to reach the predetermined destination or a relative fuel economy for the vehicle. An algorithm is executed for at least some of the routes available to reach the predetermined destination. The algorithm includes a plurality of variables defined by respective operating characteristics for the vehicle, including at least one of a predicted travel time for the vehicle to reach the predetermined destination and a predicted fuel economy for the vehicle. The driver operating preferences act as modifiers for the variables. One of the routes is selected based at least in part on the execution of the algorithm. An informational output is provided, which indicates the selected route.

Embodiments of the present invention also provide a system for providing route information to a driver of a vehicle given a predetermined destination having more than one route available to reach the predetermined destination. The vehicle includes a powertrain having an engine and an energy storage device operable to output electrical energy to vehicle electrical loads. The system includes a control system operatively connected to the powertrain and including at least one controller. The control system is configured to receive inputs related to driver operating preferences for the vehicle, and receive route information for at least some of the routes. The route information includes at least one of: a distance to the predetermined destination traveling the route, topography and geography of the route, traffic infrastructure of the route, current traffic conditions along the route, or current weather conditions along the route. The control system is further configured to execute an algorithm for at least some of the routes available to reach the predetermined destination. The algorithm is configured to use operating characteristics for the vehicle for each of the at least some routes, apply a respective weighting factor to at least one of the operating characteristics, and rank each of the at least some routes based at least in part on the weighted operating characteristics. The control system then selects one of the routes based at least in part on the execution of the algorithm, and provides an informational output indicating the selected route.

DETAILED DESCRIPTION OF THE PREFERRED EMBODIMENT(S)

Figure 1:
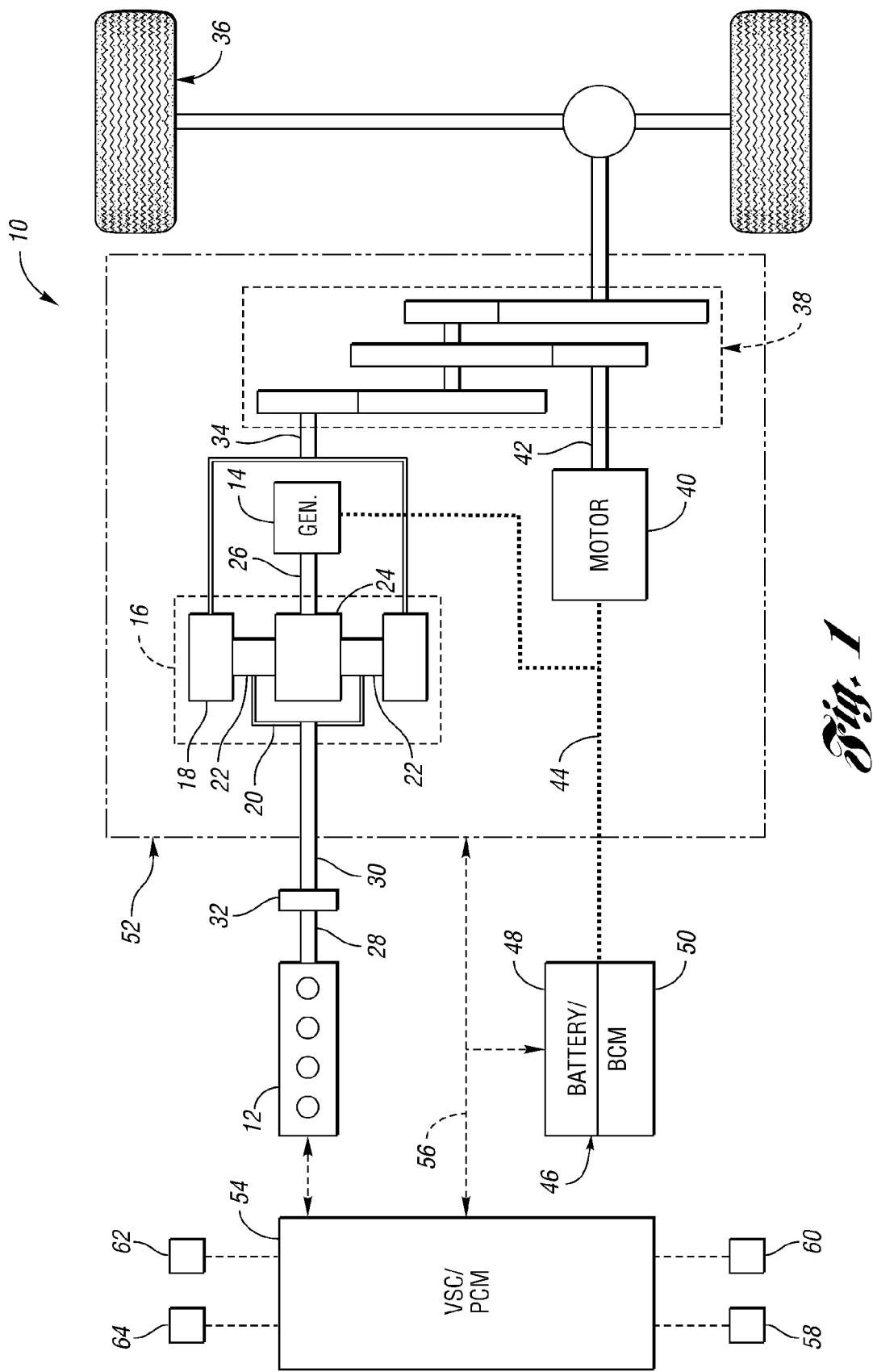
FIG. 1 shows a schematic representation of a hybrid electric vehicle including a control system in accordance with the present invention.

FIG. 1 shows a schematic representation of a vehicle 10, which includes an engine 12 and an electric machine, or generator 14. The engine 12 and the generator 14 are connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also be used as a motor, outputting torque to a shaft 26 connected to the sun gear 24. Similarly, the engine 12 outputs torque to a crankshaft 28, which is connected to a shaft 30 through a passive clutch 32. The clutch 32 provides protection against over-torque conditions. The shaft 30 is connected to the carrier 20 of the planetary gear arrangement 16, and the ring gear 18 is connected to a shaft 34, which is connected to a first set of vehicle drive wheels, or primary drive wheels 36, through a gear set 38.

The vehicle 10 includes a second electric machine, or motor 40, which can be used to output torque to a shaft 42 connected to the gear set 38. Other vehicles within the scope of the present invention may have different electric machine arrangements, such as more or fewer than two electric machines. In the embodiment shown in FIG. 1, the electric machine arrangement—i.e., the motor 40 and the generator 14—can both be used as motors to output torque. Alternatively, each can also be used as a generator, outputting electrical power to a high voltage bus 44 and to an energy storage system 46, which includes a battery 48 and a battery control module (BCM) 50.

The battery 48 is a high voltage battery that is capable of outputting electrical power to operate the motor 40 and the generator 14. The BCM 50 acts as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 48—i.e., the generator 14 and motor 40—a vehicle control system, shown generally as controller 54, is provided. As shown in FIG. 1, the controller 54 is a vehicle system controller/powertrain control module (VSC/PCM). Although it is shown as a single controller, it may include multiple controllers. For example, the PCM portion of the VSC/PCM 54 may be software embedded within the VSC/PCM 54, or it can be a separate hardware device.

A controller area network (CAN) 56 allows the VSC/PCM 50 to communicate with the transmission 52 and the BCM 50. Just as the battery 48 includes a BCM 50, other devices controlled by the VSC/PCM 54 may have their own controllers. For example, an engine control unit (ECU) may communicate with the VSC/PCM 54 and may perform control functions on the engine 12. In addition, the transmission 52 may include a transmission control module (TCM), configured to coordinate control of specific components within the transmission 52, such as the generator 14 and/or the motor 40. Some or all of these various controllers can make up a control system in accordance with the present invention. Although illustrated and described in the context of the vehicle 10, which is an HEV, it is understood that embodiments of the present invention may be implemented on other types of vehicles.

The VSC/PCM 56 is configured to receive a number of inputs that provide information related to providing route information to a driver. For example, information related to a vehicle operating preference may be received by the VSC/PCM 56 from a driver interface device 58, which is accessible from inside the vehicle 10. The vehicle operating preference may generally be determined by a vehicle operator, who inputs his or her driver operating preferences into the driver interface device 58. Driver operating preferences can include such things as a relative time to reach a predetermined destination, or a relative fuel economy for the vehicle. In particular, a driver may desire to place a priority on arriving at a destination quickly, or conversely, may choose to maximize fuel economy while arriving at the destination later. These types of preferences can be input through the driver interface device 58, which can be any device effective to facilitate such communication—for example, a human machine interface (HMI) device such as is known in the art.

In the context of the operating preferences, the term "relative" indicates that a driver will generally not input an actual time of travel or time of arrival, rather, the driver will merely indicate that time to the destination or fuel economy is preferable. For each such preference, the driver may input a level of relative importance, for example, assigning a value of 70% to travel time and 30% to fuel economy, thereby indicating a strong preference for quickly reaching the destination. The inputs may be in the form of percentages, as in the example above, or they may be in numbers or letters, or any indicator effective to communicate the driver's preferences.

In addition to preferences indicating the relative time to reach a destination and a relative fuel economy, the present invention contemplates the use of other preferences. For example, a driver may also input a preference for a state of charge for the battery 48, and in particular, a final SOC. The final SOC may be important for a number of reasons. For example, it may be desired to maintain the SOC between upper and lower limits to maximize its useful life. Conversely, allowing the battery 48 to discharge more fully may reduce the battery life, but allow the vehicle to be driven by the motors for longer periods of time; this can increase fuel economy. Where additional driver preferences are available to input, the driver may assign a percentage preference to each, or as described above, may assign other indicators of preference.

Although the driver may have complete control over the priorities assigned to the operating preferences, embodiments of the present invention may include limits on the driver's choices. For example, in the case of a commercial fleet vehicle, or lease vehicle, the vehicle owner may choose to have limits programmed into the control system to promote the owner's priorities. As described above, operating the vehicle with certain operating preferences may decrease battery life—in some cases this decrease may be significant. A vehicle owner may choose to limit a driver's choices to help ensure that the battery life is not too severely compromised. Such limits can be preprogrammed into the system in such a way that they cannot be modified by the driver.

In addition, embodiments of the present invention may include limits on the operating preferences which are imposed by the owners or controllers of the roadways—i.e., government agencies. For example, efficient road utilization may be a priority for government agencies, but such efficiency may be at odds with a driver's preferences. Similar to the embodiments described above, in which vehicle owner priorities were used to limit driver preferences, other embodiments may limit driver preferences based on government requirements. In some cases, a driver may wish to reduce travel time, but the fastest, most direct route to the destination is over-crowded. In such a case, to avoid the undesirable consequences of high vehicle density, the driver's choices may be limited to a less densely traveled route, even if travel time is slightly increased. This limit may be implemented by preprogramming, for example, a relative road utilization factor that requires a certain minimum priority be assigned to efficient road utilization.

As described in detail below, the present invention uses a combination of driver preferences and operating characteristics for the vehicle to determine a desired route, which is indicated to the driver through, for example, a navigation system 60. In addition to providing an output for the driver, the navigation system may also provide inputs to the VSC/PCM 54 that can be used to implement the present invention. Other sensors and systems may also provide information to the VSC/PCM 54 that can be used in implementation of the present invention. For example, environmental conditions may be input through a weather information system 62. A weather information system, such as the system 62, may have temperature and humidity sensors, or may include a receiver to receive weather data from external sensors, for example, sensors embedded in the road.

To further improve implementation of the present invention, the vehicle 10 may be equipped with a traveler information system 64, which receives real time information related to current traffic conditions, including the volume and direction of traffic flow, the location of traffic signals, construction slowdowns, etc. One such traveler information system is described in U.S. patent application Ser. No. 11/276,526, filed on 3 Mar. 2006, and entitled "Travel System for a Vehicle", which is hereby incorporated herein by reference. Although such information may not be available universally because of infrastructure limitations, when present, this information can enhance implementation of the present invention.

Figure 2:
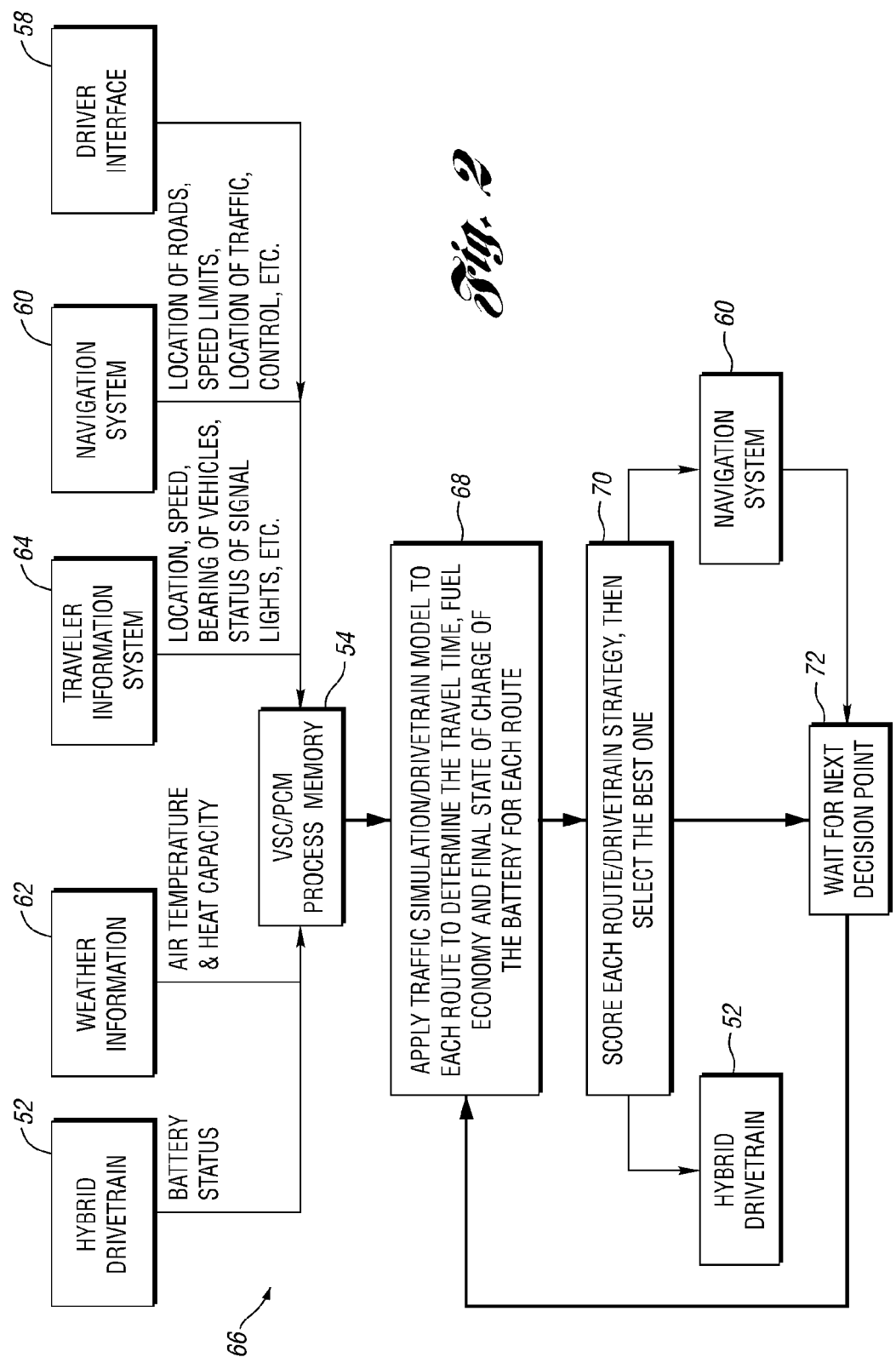
FIG. 2 shows a flow chart illustrating a method of the present invention.

The VSC/PCM 54 is configured to execute a method of the present invention, one embodiment of which is illustrated in the flow chart 66 shown in FIG. 2. As shown in FIG. 2, a number of inputs are used in the decision making process that ultimately leads to the selection of a route which is communicated to the driver. The inputs may be received, for example from the transmission 52 (hybrid drivetrain), the driver interface 58, the navigation system 60, the weather information system 62, the traveler information system 64, or some combination thereof. Of course, additional information may be gathered from one or more additional inputs as desired.

In the embodiment shown in FIG. 2, each of the inputs is received by the vehicle control system through the VSC/PCM 54, and in particular, to a process memory in the VSC/PCM 54. The information received by the VSC/PCM 54 is then used in the application of a traffic simulation/drivetrain model for each route available to reach the predetermined destination—this is shown at step 68. For each of the routes available, certain vehicle operating characteristics are calculated, for example, the travel time, fuel economy, and final SOC. Although the current example describes making these calculations for each route, the present invention includes embodiments in which only some of the routes are analyzed in this fashion. For example, some routes may have such a long travel time that the final SOC and fuel economy are not calculated. Moreover, some routes may not be completely analyzed, and none, or only a few, of the operating characteristics examined.

At step 70, the routes are examined based on the operating characteristics (drivetrain strategy) and the driver preferences, and the routes are assigned a score. It is understood that the "scoring" may include assigning an actual number to a route, or it may involve a relative comparison between the routes. For example, in one embodiment, all of the routes may be ranked according to their respective scores. In another embodiment, the best route may be separated from the others, which are lumped together into a single group. Although the selection of a particular route may occur by any method effective to consider inputs such as those described above, and choose a route based on such inputs, one method is now particularly described.

The VSC/PCM 54 may be programmed with an algorithm that considers various vehicle operating characteristics for the routes and also considers driver preferences. The algorithm may be in the form of an equation, for example:

$$\text{Score} = At + Be_f + Cb_{SOC} + Dr_u$$

Where:
- $t$ is a variable representing travel time to reach the destination,
- $e_f$ is a variable representing fuel economy,
- $b_{SOC}$ is a variable representing the final state of charge of the battery,
- $r_u$ is a variable representing road utilization, and
- A, B, C and D are constants, representing driver preferences in the form of weighting factors applied to the variables.

Once the scores are determined for the routes, the selected route is indicated, for example, by sending the information to the driver via the navigation system 60. Application of the algorithm is one way in which the present invention can improve overall economy of operation of a vehicle, such as the vehicle 10. An "overall economy" may generally be described as a balance between such factors as fuel economy, travel time, battery life, and efficient road utilization. Described in terms of "entities", the present invention can balance the priorities of the driver, the owner of the vehicle, and the owner of the roads. The extent of the control of any of these entities can be different for different embodiments of the invention.

Once a route is selected, various prompts can be used to help the driver maintain the selected route. Such prompts may include one or more audio, visual, or tactile prompts; they can indicate to the driver when to change lanes, enter a highway, etc. In addition to communicating the selected route to the driver, the selected route is also communicated to the transmission 52 (hybrid drivetrain), so that the vehicle 10 can be operated appropriately—e.g., maintaining the SOC at a certain level or allowing it to discharge, etc.

The method "ends" at step 72, where a waiting period occurs until the next decision point is reached. In general, a decision point occurs anywhere that there is a potential choice between different routes. It is worth noting that although the discussion thus far has been limited to routes between a current location and a final destination, each route can also be divided into a plurality of sub-routes to which the algorithm can be applied, and certain sub-routes selected based on the same criteria describe above. As shown in FIG. 2, the method loops back from step 72 to step 68 when a new decision point is reached.

Figure 3:
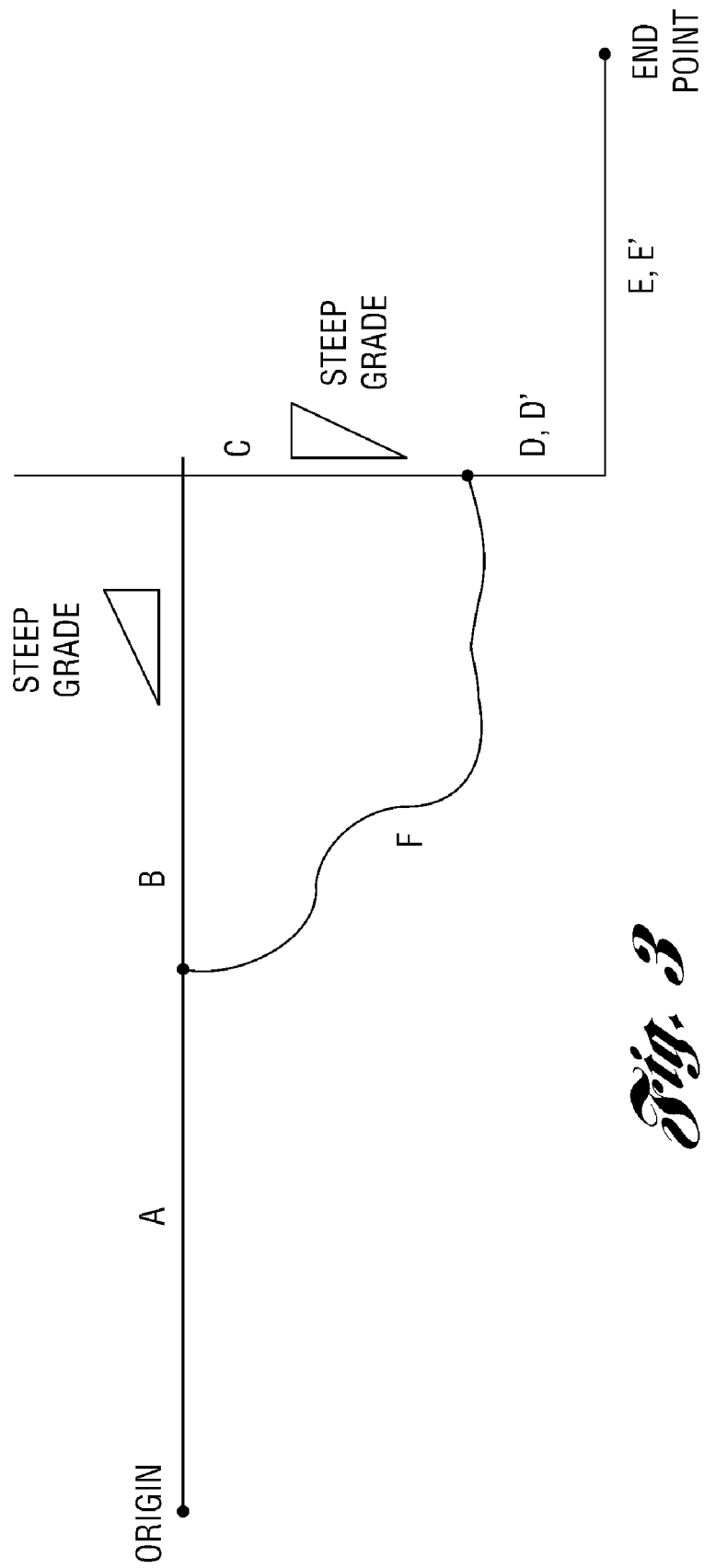
FIG. 3 is a diagram illustrating two possible routes to reach a common destination, and to which the present invention is applied.
Figure 4:
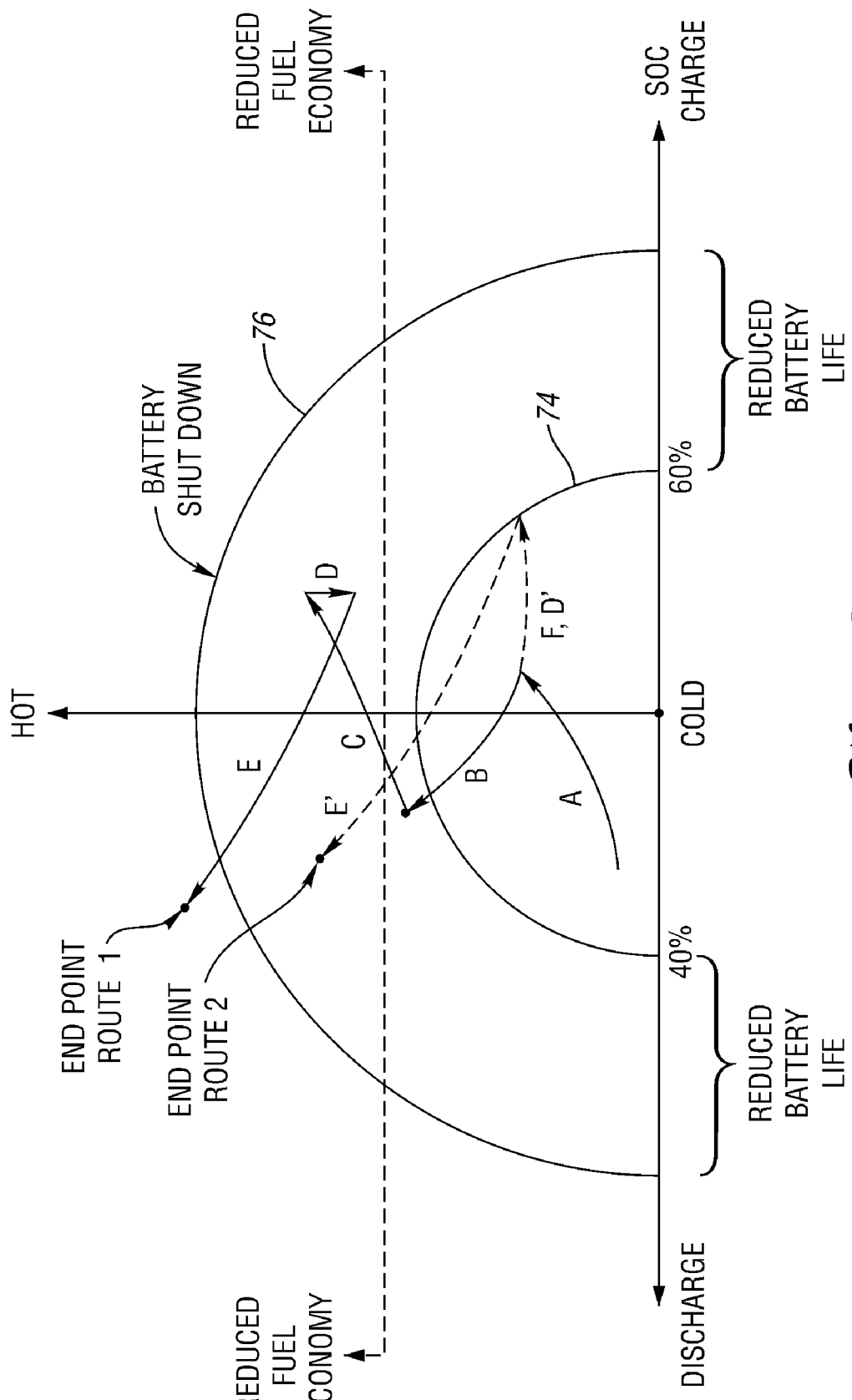
FIG. 4 is a battery management diagram illustrating the two routes from FIG. 3, in conjunction with the application of the present invention.

FIGS. 3 and 4 illustrate how the present invention can be used to select between two alternate routes. In FIG. 3, the origin and end points may respectively represent a starting point prior to traveling, and a final destination. Conversely, they may represent a current location of a vehicle already traveling, and the end of one sub-route that is part of an overall travel plan. As shown in FIG. 3, there are two routes between the origin and the end point that may be analyzed. The first route consists of five legs: A, B, C, D, and E. Leg B has a steep incline, while Leg A has a steep decline. The second route consists of only four legs: A, F, D', and E'. For the second route, Legs D' and E' use the prime symbol (') to distinguish from Legs D and E in route one, although it is apparent from FIG. 3 that D and D', and E and E', are coincident. In contrast to Legs B and C, Leg F has no steep grades, although it does include a number of curves. Therefore, it can be expected that the effect on the vehicle 10 will be different, depending on whether the first or second route is chosen.

FIG. 4 shows a battery management diagram that illustrates how different routes can have different effects on a battery, for example, the battery 48 shown in the HEV 10 in FIG. 1. Along the abscissa of the graph in FIG. 4 is the battery SOC, and along the ordinate is temperature, increasing in an upward direction. In general, it may be desirable to keep the battery SOC between 40% and 60%; however, deviations above or below these levels may also be allowed. An inner boundary line 74 connects the 40% and 60% levels, and, as shown in the drawing figure, certain deviations outside the inner boundary line 74 result in reduced battery life. Although some deviation outside the desired range is allowed, too great a deviation can result in battery shutdown. This is indicated by an outer boundary line 76.

As illustrated in FIG. 4, temperature also plays an important role in battery management. For example, the outer boundary line 76 may be traversed at different values of the battery SOC. In general, as the temperature of the battery increases, the less deviation outside the desired 40%-60% range is needed to cross the outer boundary line 76. Indeed, when the temperature is high enough, the outer boundary line 76 can be crossed, and the battery shut down, even with the battery SOC is centered within the desired range. In addition to the inner and outer boundary lines 74, 76, FIG. 4 also illustrates a line 78, above which fuel economy will be reduced. This reduction in fuel economy may be the result of a number of different factors, not the least of which is the need to shut down the battery and power the vehicle from the engine, rather than the electric motor or motors.

The two routes illustrated in FIG. 3 are superimposed on the battery management diagram shown in FIG. 4. In particular, the first route (A, B, C, D, E) starts with the battery at a relatively cool temperature, and well within the desired 40%-60% range of SOC. Climbing the steep slope in Leg B, results in a reduction in SOC, and an increase in battery temperature. Traveling the steep decline in Leg C allows the battery to recharge, but further increases its temperature. Legs D and E further decrease the SOC and increase the temperature, until the end point is reached outside the outer boundary line 76, indicating that the battery has shut down.

In contrast, the second route (A, F, D', E') provides increased battery life by avoiding the steep inclines and declines of the first route. Although Leg A is common to both routes, and Legs E and E' are approximately parallel, Leg F provides a markedly different effect on the battery than do Legs B and C. As shown in FIG. 4, the battery stays within the desired SOC range (40%-60%) from the starting point, all the way through Leg D'. This provides an advantage for battery management, in that the last Leg E', which increases battery temperature and decreases SOC, finishes with the battery still within the desired SOC range, albeit at a somewhat higher than optimum temperature.

The contrast between the two routes, and their different effects on the battery, provides one example of the relationship between fuel economy, battery life, and travel time that the present invention addresses. For example, the second route, although easier on the battery, may require longer travel time, as the Leg F is a winding road that may have a lower speed limit. In accordance with the present invention, the decision to select the first or second route can be based not only on battery management and fuel economy, but also based on desired travel time. Thus, depending on the driver operating preferences, the first route may be chosen over the second, despite being harder on the battery. Conversely, another driver, or even the same driver at another time, may input preferences that lead to the selection of the second route, for example, when travel time is not the predominate issue. Thus, the present invention provides a flexible solution that can utilize both vehicle operating characteristics and driver preferences to select an appropriate route of travel.

While the best mode for carrying out the invention has been described in detail, those familiar with the art to which this invention relates will recognize various alternative designs and embodiments for practicing the invention as defined by the following claims.

What is claimed:

1. A method comprising:
    receiving an input indicating an operating preference including a relative state of charge of an energy storage device when a predetermined destination is reached;
    determining operating characteristics for a vehicle including a predicted state of charge of the energy storage device for routes available to reach the predetermined destination; and
    selecting one of the routes to be displayed based in part on the determined operating characteristics and the received operating preference.

2. The method of claim 1, wherein the operating preference further includes a relative road utilization.

3. The method of claim 1, further comprising segmenting one of the routes into a plurality of sub-routes, each of the sub-routes defining a respective intermediate destination;
    wherein the step of determining vehicle operating characteristics includes determining vehicle operating characteristics for each of the sub-routes, and
    the step of selecting one of the routes includes selecting one of the sub-routes based at least in part on the determined operating characteristics and the received operating preference.

4. The method of claim 1, wherein the step of determining vehicle operating characteristics further includes:
    receiving route information including topography and geography of the route for at least some of the routes; and
    predicting the vehicle operating characteristics based at least in part on the received route information.

5. The method of claim 1, the vehicle further including a powertrain that includes an engine and the energy storage device, and wherein the step of determining vehicle operating characteristics further includes:
    receiving route information including current traffic conditions for at least some of the routes;
    predicting a speed and flow of traffic the vehicle is likely to encounter along the at least some of the routes based on received route information related to current traffic conditions; and
    predicting fuel consumption for the at least some of the routes and the powertrain's ability to provide the necessary power along the at least some of the routes based at least in part on the speed and flow of the traffic.

6. The method of claim 1, further comprising: advising a driver when a particular maneuver is necessary, including at least one of switching lanes, accelerating, braking, stopping, or turning.

7. A method for providing route information to a driver of a vehicle given a predetermined destination having more than one route available to reach the predetermined destination, the method comprising:
    receiving an input indicating driver operating preferences for the vehicle, the driver operating preferences including a relative fuel economy for the vehicle and a relative state of charge of an energy storage device when the predetermined destination is reached;
    executing an algorithm for evaluating at least some of the routes available to reach the predetermined destination, the algorithm including a plurality of variables defined by respective operating characteristics for the vehicle, including a predicted fuel economy for the vehicle and a predicted state of charge of the energy storage device, the driver operating preferences acting as modifiers for the variables;
    selecting one of the routes based at least in part on the execution of the algorithm; and
    providing an informational output indicating the selected route.

8. The method of claim 7, wherein the driver operating preferences further include at least one of: a relative travel time to reach the predetermined destination or a relative road utilization.

9. The method of claim 8, wherein each of the driver operating preferences defines a coefficient for a respective one of the variables in the algorithm.

10. The method of claim 9, further comprising segmenting one of the routes into a plurality of sub-routes, each of the sub-routes defining a respective intermediate destination; and
    executing the algorithm for evaluating each of the sub-routes, and wherein the step of selecting one of the routes includes selecting one of the sub-routes based at least in part on the execution of the algorithm, and the step of providing an informational output includes providing an informational output indicating the selected sub-route.

11. The method of claim 10, further comprising segmenting another one of the routes into a plurality of other sub-routes, each of the other sub-routes defining a respective intermediate destination; and executing the algorithm for evaluating each of the other sub-routes, and wherein the step of selecting one of the routes includes selecting one of the other sub-routes based at least in part on the execution of the algorithm, and the step of providing an informational output includes providing an informational output indicating the selected other sub-route.

12. The method of claim 7, further comprising:

receiving route information for the at least some of the routes, the route information including at least one of: a distance to the predetermined destination traveling the route, topography and geography of the route, traffic infrastructure of the route, current traffic conditions along the route, or current weather conditions along the route; and predicting the operating characteristics of the vehicle for the at least some of the routes based at least in part on the received route information.

13. The method of claim 12, the vehicle further including a powertrain that includes an engine and the energy storage device, and wherein predicting the operating characteristics for the at least some of the routes includes:

predicting a speed and flow of traffic the vehicle is likely to encounter along the at least some of the routes based on received route information related to current traffic conditions; and predicting fuel consumption for the at least some of the routes and the powertrain's ability to provide the necessary power along the at least some of the routes based at least in part on the speed and flow of the traffic.

14. The method of claim 7, wherein the step of providing an informational output includes advising the driver when a particular maneuver is necessary, including at least one of switching lanes, accelerating, braking, stopping, or turning.

15. A system for providing route information to a driver of a vehicle given a predetermined destination having more than one route available to reach the predetermined destination, the system comprising:

a control system operatively connected to a powertrain and including at least one controller, the control system being configured to:

receive inputs related to driver operating preferences for the vehicle, receive route information for the routes, including for each of the routes a topography and geography of the route and at least one of: a distance to the predetermined destination traveling the route, traffic infrastructure of the route, current traffic conditions along the route, or current weather conditions along the route, and execute an algorithm for evaluating at least some of the routes available to reach the predetermined destination, the algorithm being configured to use operating characteristics for the vehicle for each of the at least some routes, apply a respective weighting factor to at least one of the operating characteristics, and rank each of the at least some routes based at least in part on the weighted operating characteristics, the control system being further configured to select one of the routes based at least in part on the execution of the algorithm, and to provide an informational output indicating the selected route.

16. The system of claim 15, wherein the operating characteristics include at least one of a predicted travel time to reach the predetermined destination and a predicted fuel economy for the vehicle, and a predicted state of charge for the energy storage device when the predetermined destination is reached.

17. The system of claim 16, wherein the driver operating preferences include at least one of a relative travel time to reach the predetermined destination or a relative fuel economy for the vehicle.

18. The system of claim 15, wherein the algorithm includes a plurality of variables, each of the variables being defined by a respective one of the operating characteristics for the vehicle.

19. The system of claim 18, wherein each of the driver operating preferences defines a coefficient for a respective one of the variables in the algorithm.

20. The system of claim 19, wherein execution of the algorithm provides a score for each of the at least some routes, and the selected route is chosen based on the score.

* * * * *